(12) United States Patent
Kim

(10) Patent No.: US 11,294,510 B2
(45) Date of Patent: Apr. 5, 2022

(54) METHOD, SYSTEM AND NON-TRANSITORY COMPUTER-READABLE RECORDING MEDIUM FOR SUPPORTING OBJECT CONTROL BY USING A 2D CAMERA

(71) Applicant: VTOUCH CO., LTD., Seoul (KR)

(72) Inventor: Seok Joong Kim, Seoul (KR)

(73) Assignee: VTOUCH CO., LTD., Seoul (KR)

(*) Notice: Subject to any disclaimer, the term of this patent is extended or adjusted under 35 U.S.C. 154(b) by 0 days.

(21) Appl. No.: 17/096,355

(22) Filed: Nov. 12, 2020

(65) Prior Publication Data

US 2021/0064160 A1    Mar. 4, 2021

Related U.S. Application Data

(63) Continuation of application No. PCT/KR2020/003063, filed on Mar. 4, 2020.

(30) Foreign Application Priority Data

Mar. 11, 2019 (KR) .......................... 10-2019-0027623

(51) Int. Cl.
*G06F 3/042* (2006.01)
*G06V 40/13* (2022.01)
*G06V 40/19* (2022.01)

(52) U.S. Cl.
CPC .............. *G06F 3/042* (2013.01); *G06V 40/13* (2022.01); *G06V 40/19* (2022.01)

(58) Field of Classification Search
CPC ...................... G06F 3/042; G06F 3/017; G06F 2203/04108; G06F 3/0425; G06F 3/0421; G06F 3/0416; G06F 3/0304; G06F 3/013; G06K 9/00013; G06K 9/00604; G06K 9/00382; G06K 9/00597; G06K 9/00335; G06K 9/20; H04N 13/383; G06V 40/13;
(Continued)

(56) References Cited

U.S. PATENT DOCUMENTS

2016/0179205 A1* 6/2016 Katz .................... G06F 3/013
345/156
2019/0163284 A1* 5/2019 Kim .................... G06K 9/00355

FOREIGN PATENT DOCUMENTS

KR   1020110037053 A   4/2011
KR   1020120095084 A   8/2012
(Continued)

OTHER PUBLICATIONS

International Search Report of PCT/KR2020/003063 dated Jun. 25, 2020.

*Primary Examiner* — Abhishek Sarma
(74) *Attorney, Agent, or Firm* — Dinsmore & Shohl LLP; Yongsok Choi, Esq.

(57) ABSTRACT

According to one aspect of the present invention, there is provided a method for assisting object control using a two-dimensional camera, comprising the steps of: acquiring a two-dimensional image of a user's body from a two-dimensional camera; and determining a control target area with reference to a candidate target area specified on the basis of two-dimensional relative coordinate points respectively corresponding to a first body part and a second body part of the user in the two-dimensional image, wherein the candidate target area and the control target area are determined on a reference surface established with respect to the two-dimensional camera.

9 Claims, 7 Drawing Sheets

(58) Field of Classification Search
CPC ........ G06V 40/19; G06V 40/11; G06V 40/18; G06V 40/20
See application file for complete search history.

(56) References Cited

FOREIGN PATENT DOCUMENTS

| | | | |
|---|---|---|---|
| KR | 1020120126508 | A | 11/2012 |
| KR | 1020130124816 | A | 11/2013 |
| KR | 1020140029864 | A | 3/2014 |
| KR | 101533319 | B1 | 7/2015 |

\* cited by examiner

METHOD, SYSTEM AND NON-TRANSITORY COMPUTER-READABLE RECORDING MEDIUM FOR SUPPORTING OBJECT CONTROL BY USING A 2D CAMERA

CROSS-REFERENCE TO RELATED APPLICATION(S)

This application is a continuation application of Patent Cooperation Treaty (PCT) International Application No. PCT/KR2020/003063 filed on Mar. 4, 2020, which claims priority to Korean Patent Application No. 10-2019-0027623 filed on Mar. 11, 2019. The entire contents of PCT International Application No. PCT/KR2020/003063 and Korean Patent Application No. 10-2019-0027623 are hereby incorporated by reference.

This application is filed with the support of Korean Ministry of Science and ICT under Project No. A0712-20-1024 awarded by National IT Industry Promotion Agency (NIPA) of Republic of Korea.

FIELD OF THE INVENTION

The present invention relates to a method, system, and non-transitory computer-readable recording medium for assisting object control using a two-dimensional camera.

BACKGROUND

In recent years, as interest in augmented reality (AR) or virtual reality (VR) is increasing and research and development in related technical fields are actively carried out, a variety of techniques for controlling an object using a body part of a user have been introduced.

As an example of related conventional techniques, Korean Laid-Open Patent Publication No. 10-2012-126508 discloses a method for recognizing a touch in a virtual touch device without using a pointer, wherein the virtual touch device comprises: an image acquisition unit composed of two or more image sensors disposed at different positions and configured to photograph a user's body in front of a display surface; a spatial coordinate calculation unit configured to calculate three-dimensional coordinate data of the user's body using an image received from the image acquisition unit; a touch position calculation unit configured to use first and second spatial coordinates received from the spatial coordinate calculation unit to calculate coordinate data of a contact point where a straight line connecting the first and second spatial coordinates meets the display surface; and a virtual touch processing unit configured to generate a command code for performing an operation corresponding to the contact point coordinate data received from the touch position calculation unit and input the command code to a main control unit of an electronic apparatus, and wherein the method comprises the steps of: (a) processing three-dimensional coordinate data (X1, Y1, Z1) of a fingertip and three-dimensional coordinate data (X2, Y2, Z2) of a center point of an eye to detect a contact point A of the eye, a fingertip point B, and a display surface C, respectively; (b) calculating at least one of a depth change, a trajectory change, a holding time, and a change rate of the detected fingertip point; and (c) causing the electronic apparatus to be operated or causing an area corresponding to a touched part of a touch panel to be selected, on the basis of the at least one of the depth change, the trajectory change, the holding time, and the change rate of the fingertip point.

According to the techniques introduced so far as well as the above-described conventional technique, a process of acquiring three-dimensional coordinates of a user's body parts using a three-dimensional camera is essentially required in order to select or control an object. However, the three-dimensional camera is not only expensive but also causes a lot of delays in the course of processing three-dimensional data. A central processing unit (CPU) or the like with higher performance is required to address the delays, resulting in a higher overall price.

In this connection, the inventor(s) present a novel and inventive technique for assisting a user to efficiently and accurately select or control an intended target object using only a conventional two-dimensional camera, without a three-dimensional camera.

SUMMARY OF THE INVENTION

One object of the present invention is to solve all the above-described problems in the prior art.

Another object of the invention is to accurately determine a control target area that meets a user's intention using only information acquired through a two-dimensional camera, without using a precise sensing means such as a three-dimensional camera.

Yet another object of the invention is to efficiently determine a control target area using less resources.

The representative configurations of the invention to achieve the above objects are described below.

According to one aspect of the invention, there is provided a method for assisting object control using a two-dimensional camera, comprising the steps of: acquiring a two-dimensional image of a user's body from a two-dimensional camera; and determining a control target area with reference to a candidate target area specified on the basis of two-dimensional relative coordinate points respectively corresponding to a first body part and a second body part of the user in the two-dimensional image, wherein the candidate target area and the control target area are determined on a reference surface established with respect to the two-dimensional camera.

According to another aspect of the invention, there is provided a system for assisting object control using a two-dimensional camera, comprising: an image acquisition unit configured to acquire a two-dimensional image of a user's body from a two-dimensional camera; and a control target area determination unit configured to determine a control target area with reference to a candidate target area specified on the basis of two-dimensional relative coordinate points respectively corresponding to a first body part and a second body part of the user in the two-dimensional image, wherein the candidate target area and the control target area are determined on a reference surface established with respect to the two-dimensional camera.

In addition, there are further provided other methods and systems to implement the invention, as well as non-transitory computer-readable recording media having stored thereon computer programs for executing the methods.

According to the invention, it is possible to accurately determine a control target area that meets a user's intention using only information acquired through a two-dimensional camera, without using a precise sensing means such as a three-dimensional camera.

According to the invention, it is possible to efficiently determine a control target area using less resources.

DETAILED DESCRIPTION

Figure 1:
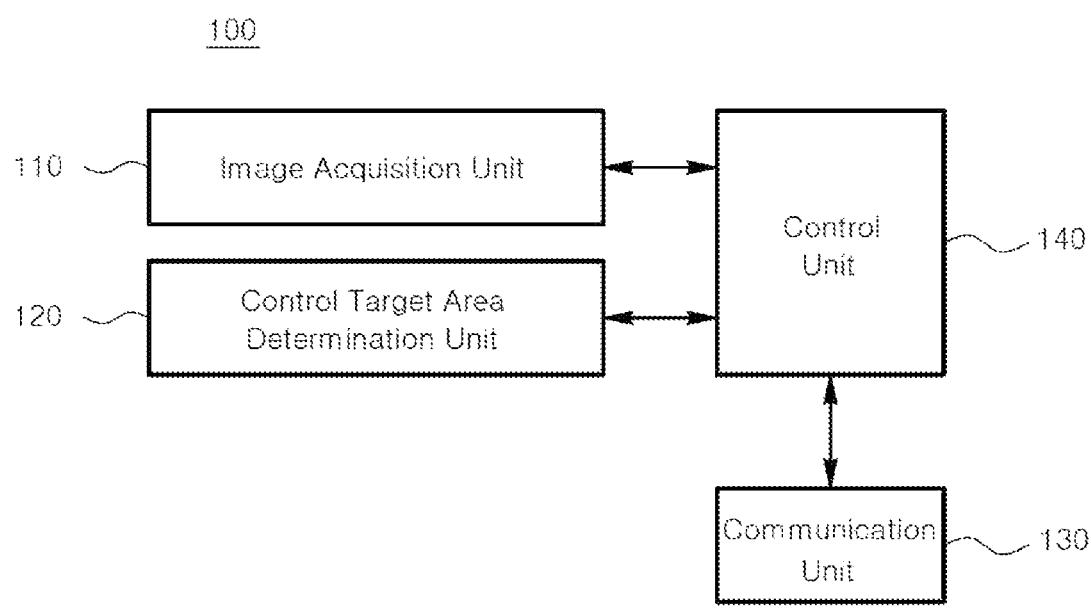
FIG. 1 specifically shows the internal configuration of an object control assistance system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

The entire system according to one embodiment of the invention may comprise a communication network, an object control assistance system 100, and a two-dimensional camera.

First, the communication network according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network described herein may be the Internet or the World Wide Web (WWW). However, the communication network is not necessarily limited thereto, and may at least partially include known wired/wireless data communication networks, known telephone networks, or known wired/wireless television communication networks.

For example, the communication network may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the object control assistance system 100 according to one embodiment of the invention may be a digital device having a memory means and a microprocessor for computing capabilities. The object control assistance system 100 may be a server system.

According to one embodiment of the invention, the object control assistance system 100 may be connected to the two-dimensional camera to be described below via the communication network or a processor (not shown), and may function to acquire a two-dimensional image of a user's body from the two-dimensional camera and to determine a control target area with reference to a candidate target area specified on the basis of two-dimensional relative coordinate points respectively corresponding to a first body part and a second body part of the user in the two-dimensional image, wherein the candidate target area and the control target area are determined on a reference surface established with respect to the two-dimensional camera.

Here, the two-dimensional relative coordinate points according to one embodiment of the invention may be specified in a relative coordinate system associated with the two-dimensional camera. For example, according to one embodiment of the invention, a two-dimensional coordinate system specified around a lens of the two-dimensional camera (e.g., the lens is centered at (0, 0)) (or around a two-dimensional image photographed by the two-dimensional camera) may be specified as the relative coordinate system in which the two-dimensional relative coordinate points may be specified.

Further, according to one embodiment of the invention, the body parts may include a head, eyes, a nose, a mouth, hands, fingertips, fingers, feet, tiptoe, toes, and the like, but are not limited to the foregoing and may be changed to various body parts as long as the objects of the invention may be achieved.

Furthermore, according to one embodiment of the invention, the control target area may be determined on the reference surface established with respect to the two-dimensional camera. According to one embodiment of the invention, the reference surface established with respect to the two-dimensional camera may encompass a surface of a predetermined size that is established around the two-dimensional camera or positioned adjacent (or within a predetermined distance) to the two-dimensional camera. The reference surface may be shaped to be flat or curved, and may include a display screen, a printed paper sheet, a wall, and the like.

The configuration and functions of the object control assistance system 100 according to the invention will be discussed in more detail below. Meanwhile, although the object control assistance system 100 has been described as above, the above description is illustrative and it will be apparent to those skilled in the art that at least a part of the functions or components required for the object control assistance system 100 may be implemented or included in an external system (not shown), as necessary.

Next, the two-dimensional camera according to one embodiment of the invention may communicate with the object control assistance system 100 by means of the communication network or a processor, and may function to acquire the two-dimensional image of the user's body. For example, the two-dimensional camera according to one embodiment of the invention may include various types of image sensors, such as a charge coupled device (CCD) and a complementary metal oxide semiconductor (CMOS).

Configuration of the Object Control Assistance System

Hereinafter, the internal configuration of the object control assistance system 100 crucial for implementing the invention and the functions of the respective components thereof will be discussed.

FIG. 1 specifically shows the internal configuration of the object control assistance system 100 according to one embodiment of the invention.

As shown in FIG. 1, the object control assistance system 100 according to one embodiment of the invention may comprise an image acquisition unit 110, a control target area determination unit 120, a communication unit 130, and a control unit 140. According to one embodiment of the invention, at least some of the image acquisition unit 110, the control target area determination unit 120, the communication unit 130, and the control unit 140 may be program modules to communicate with an external system. The program modules may be included in the object control assistance system 100 in the form of operating systems, application program modules, and other program modules, while they may be physically stored in a variety of commonly known storage devices. Further, the program modules may also be stored in a remote storage device that may communicate with the object control assistance system 100. Meanwhile, such program modules may include, but not limited to, routines, subroutines, programs, objects, components, data structures, and the like for performing specific tasks or executing specific abstract data types as will be described below in accordance with the invention.

First, the image acquisition unit 110 according to one embodiment of the invention may function to acquire a two-dimensional image of a user's body from a two-dimensional camera.

For example, the image acquisition unit 110 according to one embodiment of the invention may acquire a two-dimensional image in which the user's body including eyes (e.g., both eyes or a dominant eye) and fingers (e.g., a tip of an index finger) is photographed.

Next, the control target area determination unit 120 according to one embodiment of the invention may determine a control target area with reference to a candidate target area specified on the basis of two-dimensional relative coordinate points respectively corresponding to a first body part and a second body part of the user in the two-dimensional image. Here, the control target area determination unit 120 according to one embodiment of the invention may determine the candidate target area and the control target area on a reference surface established with respect to the two-dimensional camera.

Specifically, according to one embodiment of the invention, the candidate target area may be specified by a virtual point and a point where the two-dimensional camera is positioned on a virtual reference surface. A positional relationship between the virtual point and the point where the two-dimensional camera is positioned on the virtual reference surface may be specified by a positional relationship between the two-dimensional relative coordinate points respectively corresponding to the first and second body parts in the two-dimensional image.

Figure 2:
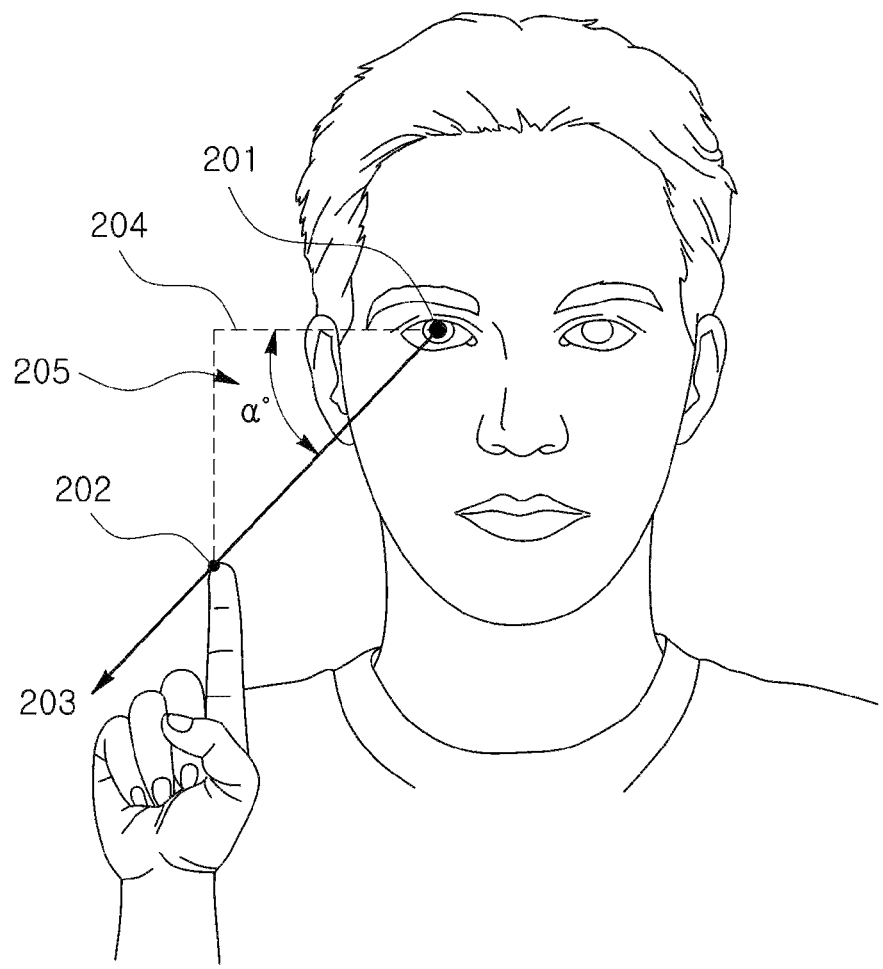
FIG. 2 illustratively shows how to determine a candidate target area using a two-dimensional camera according to one embodiment of the invention.
Figure 3:
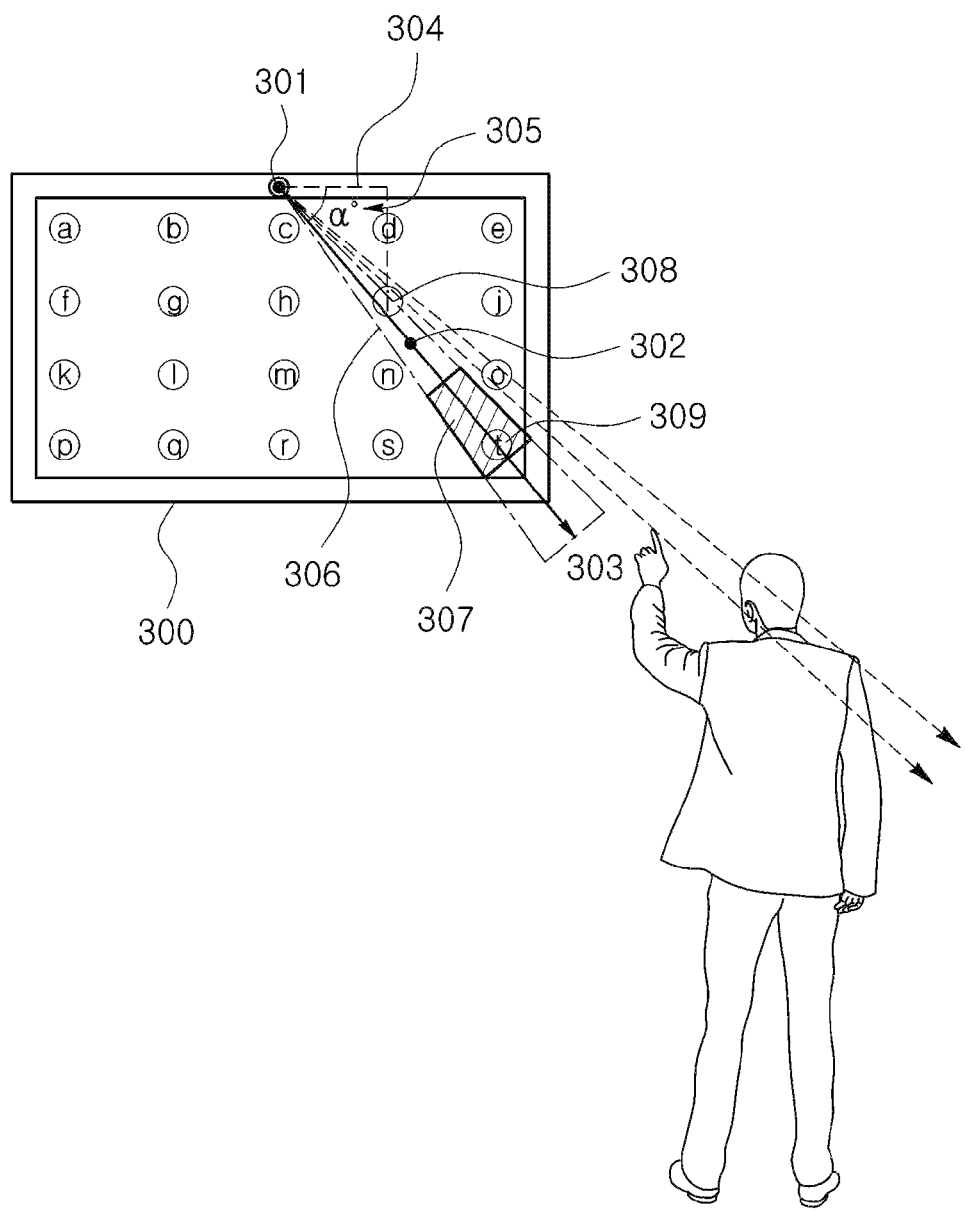
FIG. 3 illustratively shows how to determine a candidate target area using a two-dimensional camera according to one embodiment of the invention.

FIGS. 2 and 3 illustratively show how to determine a candidate target area using a two-dimensional camera according to one embodiment of the invention.

In the embodiments of FIGS. 2 and 3, the two-dimensional camera according to one embodiment of the invention may be included in an object display device, and may be positioned adjacent to the object display device if necessary. In this case, a display screen of the object display device according to one embodiment of the invention may be located on a reference surface 300 established with respect to the two-dimensional camera, or may have a matching positional relationship with the two-dimensional camera.

Further, in the embodiments of FIGS. 2 and 3, it may be assumed that objects "a" to "t" are displayed or printed on the display screen of the object display device. In addition, the objects displayed on the object display device according to the invention may be not only displayed electronically but also displayed in various ways such as printing, engraving, and embossing as long as the objects of the invention may be achieved.

Furthermore, in the embodiment of FIGS. 2 and 3, the object display device according to one embodiment of the invention may be connected to the object control assistance system 100 via the communication network or a processor, and may function to display an object to be controlled by the user. For example, according to one embodiment of the invention, the object display device may comprise a liquid crystal display (LCD), a thin film transistor LCD (TFT LCD), a light emitting diode (LED) display, an organic LED (OLED) display, an active matrix OLED (AMOLED) display, a flexible display, and a three-dimensional display.

First, referring to FIG. 2, the control target area determination unit 120 according to one embodiment of the invention may specify an angle 205 between a straight line 203 connecting two-dimensional relative coordinate points of an eye 201 and a fingertip 202 of the user specified in a two-dimensional image 200 acquired from the two-dimensional camera, and a reference line 204 preestablished in the two-dimensional image 200. Here, according to one embodiment of the invention, the reference line 204 preestablished in the two-dimensional image 200 may be a horizontal line (or a vertical line) specified by a horizontal axis (or a vertical axis) of the two-dimensional image 200, or may be a straight line parallel to a straight line connecting both eyes of the user in the two-dimensional image 200.

Next, referring to FIG. 3, the control target area determination unit 120 according to one embodiment of the invention may specify a virtual point 302 such that an angle 305 formed by a virtual straight line 303, which connects the virtual point 302 and a point 301 where the two-dimensional camera is positioned on the reference surface 300 established with respect to the two-dimensional camera, and a reference line 304 is substantially the same as the angle 205 specified in the two-dimensional image 200 of FIG. 2, and may specify an area 306 surrounding the virtual straight line 303, which connects the virtual point 302 and the point 301 where the two-dimensional camera is positioned on the reference surface 300, as a candidate target area. Here, according to one embodiment of the invention, the reference line 304 specified on the reference surface 300 may be a straight line parallel to the reference line 204 preestablished in the two-dimensional image 200, or may be a straight line corresponding to a horizontal axis of the object display device including the two-dimensional camera.

Further, according to one embodiment of the invention, the control target area determination unit 120 may determine a control target area that is judged to meet the user's control intention with reference to the specified candidate target area.

Specifically, according to one embodiment of the invention, the control target area determination unit 120 may determine an area within the specified candidate target area that is judged to be associated with a gesture of the user as the control target area. Here, according to one embodiment of the invention, the user's gesture may include a gesture of moving the first or second body part of the user (e.g., a gesture of the user moving a fingertip being photographed by the two-dimensional camera in a direction intended by the user).

Figure 4:
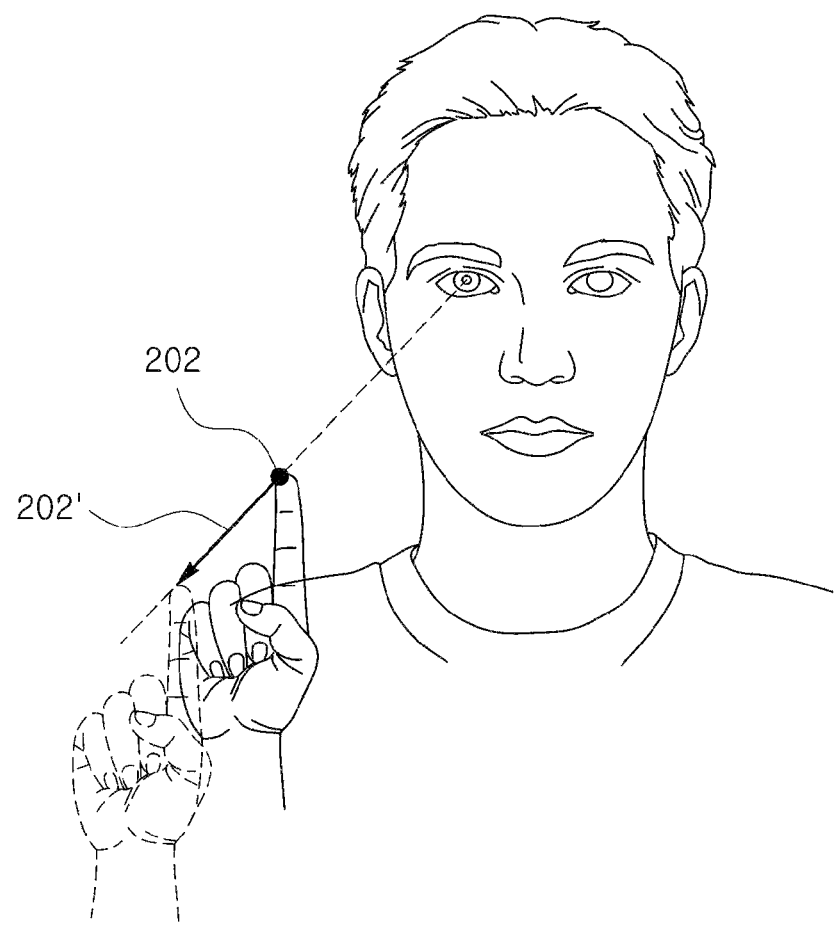
FIG. 4 illustratively shows how to determine a control target area according to a first embodiment of the invention.

FIG. 4 illustratively shows how to determine a control target area according to a first embodiment of the invention.

Referring to FIG. 4, in response to detecting a gesture by which the two-dimensional relative coordinate point 202 corresponding to the user's second body part in the two-dimensional image is moved in a lower left direction 202', the control target area determination unit 120 according to one embodiment of the invention may determine a partial area 307 positioned in a relatively lower right direction within the candidate target area 306 on the reference surface 300 as a control target area, and may further determine an object 309 positioned in the control target area 307, among two objects 308 and 309 positioned in the candidate target area 306, as an object to be controlled (or selected) by the user. That is, according to one embodiment of the invention, since the object "i" 308 and the object "t" 309 are included in the candidate target area 306 but only the object "t" 309 is included in the control target area 307, the object "t" 309 may be determined as a control target object intended by the user.

Meanwhile, according to one embodiment of the invention, the control target area determination unit 120 may provide guide information for assisting the user to identify the candidate target area specified by the object control assistance system 100, and may determine an area judged to be associated with the user's gesture recognized after the guide information is provided as a control target area.

For example, when the reference surface is established in correspondence to the object display device, the control target area determination unit 120 according to one embodiment of the invention may provide the guide information to the user by displaying the candidate target area (or an object positioned in the candidate target area) with a highlight on the object display device. Further, the control target area determination unit 120 according to one embodiment of the invention may determine a control target area within the candidate target area by recognizing a gesture that the user makes after receiving the guide information in order to accurately specify a control target area to be controlled by the user within the candidate target area.

Meanwhile, the communication unit 130 according to one embodiment of the invention may function to enable data transmission/reception from/to the image acquisition unit 110 and the control target area determination unit 120.

Lastly, the control unit 140 according to one embodiment of the invention may function to control data flow among the image acquisition unit 110, the control target area determination unit 120, and the communication unit 130. That is, the control unit 140 according to the invention may control data flow into/out of the object control assistance system 100 or data flow among the respective components of the object control assistance system 100, such that the image acquisition unit 110, the control target area determination unit 120, and the communication unit 130 may carry out their particular functions, respectively.

Meanwhile, according to another embodiment of the invention, the object control assistance system 100 may determine a control target area judged to be intended by the user on the basis of information acquired from two or more two-dimensional images of the user's body, which are acquired from two or more two-dimensional cameras, respectively.

Specifically, the object control assistance system 100 according to another embodiment of the invention may acquire a first two-dimensional image in which the user's body is photographed from a first two-dimensional camera, and a second two-dimensional image in which the user's body is photographed from a second two-dimensional camera.

Next, the object control assistance system 100 according to another embodiment of the invention may determine a control target area with reference to a first candidate target area specified on the basis of two-dimensional relative coordinate points respectively corresponding to a first body part and a second body part of the user in the first two-dimensional image, and a second candidate target area specified on the basis of two-dimensional relative coordinate points respectively corresponding to the first and second body parts of the user in the second two-dimensional image. For example, the object control assistance system 100 according to another embodiment of the invention may determine an area common to the first candidate target area and the second candidate target area as the control target area. Here, according to another embodiment of the invention, the control target area may be determined on a reference surface established with respect to the first and second two-dimensional cameras.

Figure 5A:
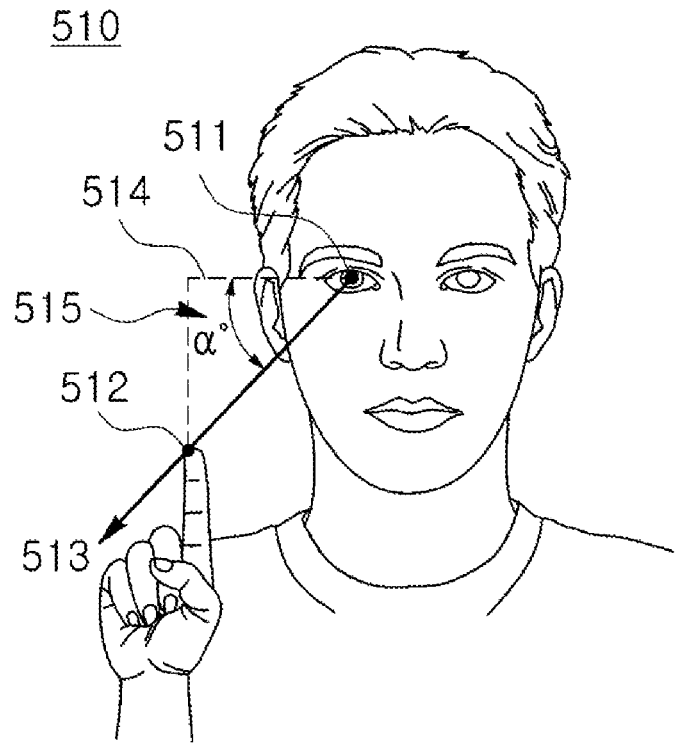
FIG. 5A illustratively shows how to determine a control target area according to another embodiment of the invention.
Figure 5B:
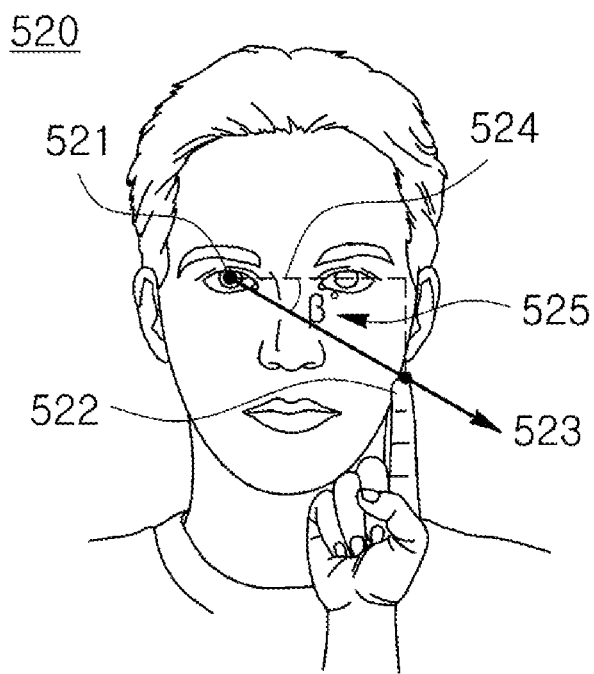
FIG. 5B illustratively shows how to determine a control target area according to another embodiment of the invention.
Figure 5C:
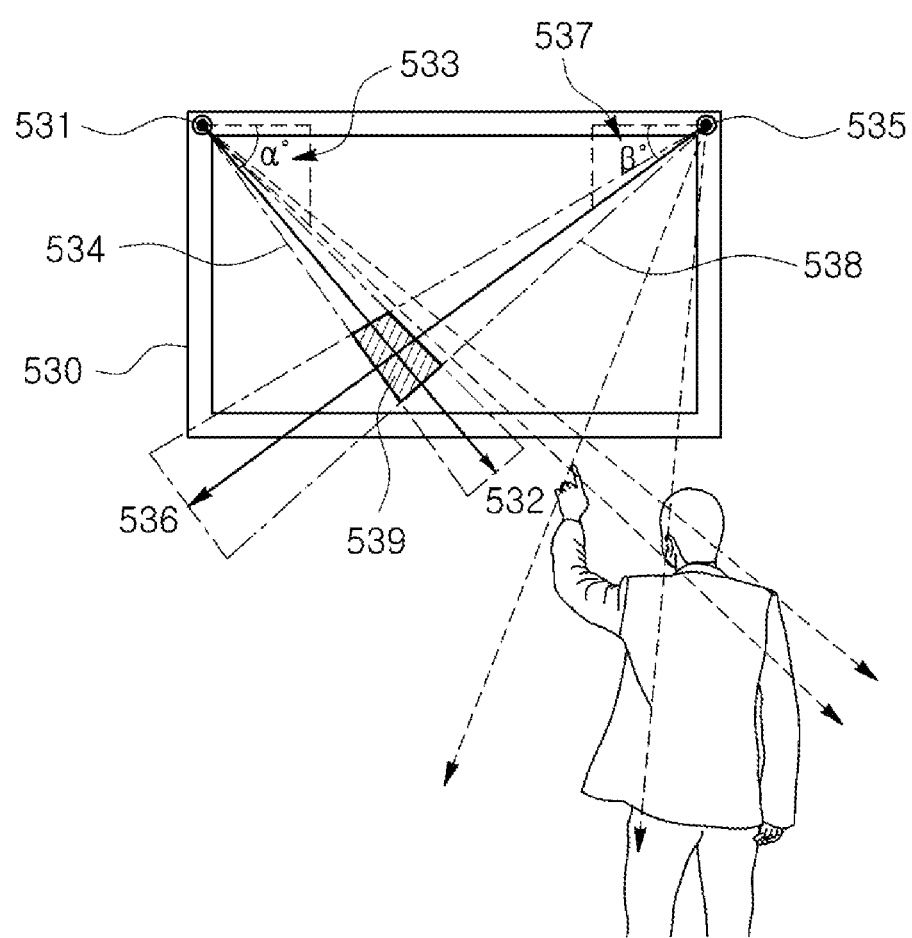
FIG. 5C illustratively shows how to determine a control target area according to another embodiment of the invention.

FIGS. 5A to 5C illustratively show how to determine a control target area according to another embodiment of the invention.

First, referring to FIG. 5A, the object control assistance system 100 according to another embodiment of the invention may specify a first angle 515 between a straight line 513 connecting two-dimensional relative coordinate points of an eye 511 and a fingertip 512 of a user specified in a first two-dimensional image 510 acquired from a first two-dimensional camera, and a reference line 514 preestablished in the first two-dimensional image 510.

Next, referring to FIG. 5B, the object control assistance system 100 according to another embodiment of the invention may specify a second angle 525 between a straight line 523 connecting two-dimensional relative coordinate points of an eye 521 and a fingertip 522 of the user specified in a second two-dimensional image 520 acquired from a second two-dimensional camera, and a reference line 524 preestablished in the second two-dimensional image 520.

Next, referring to FIG. 5C, the object control assistance system 100 according to another embodiment of the invention may specify a first virtual point such that an angle 533 formed by a first virtual straight line 532, which connects the first virtual point and a point 531 where the first two-dimensional camera is positioned on a reference surface 530 established with respect to the first and second two-dimensional cameras, and a first reference line is substantially the same as the first angle 515 specified in the first two-dimensional image 510 of FIG. 5A, and may specify an area 534 surrounding the first virtual straight line 532, which connects the first virtual point and the point 531 where the first two-dimensional camera is positioned on the reference surface 530, as a first candidate target area. Here, according to another embodiment of the invention, the first reference line specified on the reference surface 530 may be a straight line parallel to the reference line 514 preestablished in the first two-dimensional image 510, or may be a straight line corresponding to a horizontal axis of the object display device.

Referring further to FIG. 5C, the object control assistance system 100 according to another embodiment of the invention may specify a second virtual point such that an angle 537 formed by a second virtual straight line 536, which connects the second virtual point and a point 535 where the second two-dimensional camera is positioned on the reference surface 530, and a second reference line is substantially the same as the second angle 525 specified in the second two-dimensional image 520 of FIG. 5B, and may specify an area 538 surrounding the second virtual straight line 536, which connects the second virtual point and the point 535 where the second two-dimensional camera is positioned on the reference surface 530, as a second candidate target area. Here, according to another embodiment of the invention, the second reference line specified on the reference surface 530 may be a straight line parallel to the reference line 524 preestablished in the second two-dimensional image 520, or may be a straight line corresponding to the horizontal axis of the object display device.

Referring further to FIG. 5C, the object control assistance system 100 according to another embodiment of the invention may determine an area 539 on the reference surface 530 that is common to the first candidate target area 534 and the second candidate target area 538 as a control target area, and may further determine an object positioned in the control target area 539, among objects displayed on the object display device, as an object to be controlled (or selected) by the user.

That is, according to another embodiment of the invention, the user's control intention may be recognized more accurately and precisely using two or more two-dimensional images respectively acquired from two or more two-dimensional cameras.

Figure 6:
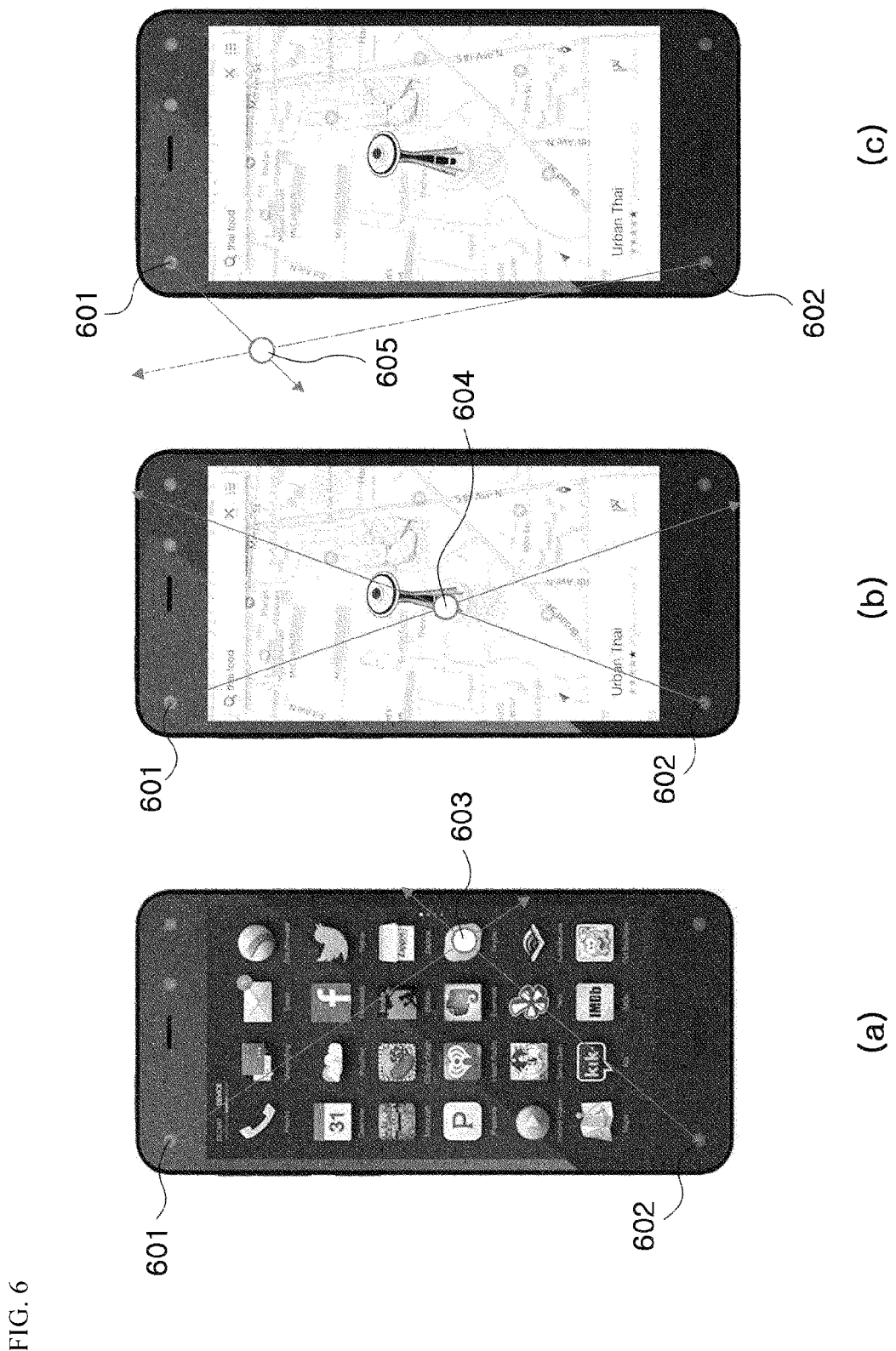
FIG. 6 illustratively shows a situation in which a control target area intended by a user is determined using two or more two-dimensional images respectively acquired from two or more two-dimensional cameras according to another embodiment of the invention.

FIG. 6 illustratively shows a situation in which a control target area intended by a user is determined using two or more two-dimensional images respectively acquired from two or more two-dimensional cameras according to another embodiment of the invention.

Referring to FIG. 6, the object control assistance system 100 according to another embodiment of the invention may use information acquired from two or more two-dimensional images, which are respectively acquired through two or more two-dimensional cameras 601 and 602 provided in a mobile device 600, to determine an icon 603 displayed on a display screen of the mobile device 600, a specific point 604 in an electronic map displayed on the display screen of the mobile device 600, any point 605 outside the display screen of the mobile device 600, or the like as a control target area intended by the user.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A system for assisting object control using a two-dimensional camera, comprising:
   an image acquisition unit configured to acquire a two-dimensional image of a user's body from a two-dimensional camera; and
   a control target area determination unit configured to determine a control target area with reference to a candidate target area specified on the basis of two-dimensional relative coordinate points respectively corresponding to a first body part and a second body part of the user in the two-dimensional image,
   wherein the candidate target area and the control target area are determined on a reference surface established with respect to the two-dimensional camera,
   wherein the candidate target area is specified on the basis of a virtual line connecting a virtual point and a point where the two-dimensional camera is positioned on the reference surface,
   wherein the virtual point is specified with reference to an angle between a line connecting the two-dimensional relative coordinate points respectively corresponding to the first and second body parts in the two-dimensional image, and a reference line established in the two-dimensional image, and
   wherein the control target area determination unit is configured to determine an object included in the control target area, among objects included in the candidate target area, as an object to be controlled by the user.

2. A method for assisting object control using a two-dimensional camera, comprising the steps of:
   acquiring a two-dimensional image of a user's body from a two-dimensional camera; and
   determining a control target area with reference to a candidate target area specified on the basis of two-dimensional relative coordinate points respectively corresponding to a first body part and a second body part of the user in the two-dimensional image, wherein the candidate target area and the control target area are determined on a reference surface established with respect to the two-dimensional camera, wherein the candidate target area is specified on the basis of a virtual line connecting a virtual point and a point where the two-dimensional camera is positioned on the reference surface, wherein the virtual point is specified with reference to an angle between a line connecting the two-dimensional relative coordinate points respectively corresponding to the first and second body parts in the two-dimensional image, and a reference line established in the two-dimensional image, and wherein in the determining step, an object included in the control target area, among objects included in the candidate target area, is determined as an object to be controlled by the user.

3. The method of claim 2, wherein the two-dimensional relative coordinate points are specified in a relative coordinate system associated with the two-dimensional camera.

4. The method of claim 2, wherein in the determining step, an area within the candidate target area that is judged to be associated with a gesture of the user is determined as the control target area.

5. The method of claim 4, wherein the gesture includes a gesture of the user moving the first body part or the second body part.

6. The method of claim 4, wherein the determining step comprises the steps of:

providing guide information for assisting the user to identify the candidate target area; and determining an area judged to be associated with the user's gesture recognized after the guide information is provided as the control target area.

7. The method of claim 2, wherein in the acquiring step, a first two-dimensional image of the user's body is acquired from a first two-dimensional camera, and a second two-dimensional image of the user's body is acquired from a second two-dimensional camera, wherein in the determining step, the control target area is determined with reference to a first candidate target area specified on the basis of two-dimensional relative coordinate points respectively corresponding to the first and second body parts of the user in the first two-dimensional image, and a second candidate target area specified on the basis of two-dimensional relative coordinate points respectively corresponding to the first and second body parts of the user in the second two-dimensional image, and wherein the first candidate target area, the second candidate target area, and the control target area are determined on a reference surface established with respect to the first and second two-dimensional cameras.

8. The method of claim 7, wherein in the determining step, an area common to the first candidate target area and the second candidate target area is determined as the control target area.

9. A non-transitory computer-readable recording medium having stored thereon a computer program for executing the method of claim 2.

* * * * *